(12) United States Patent
Einecke et al.

(10) Patent No.: US 10,912,253 B2
(45) Date of Patent: Feb. 9, 2021

(54) ROBOTIC GARDENING DEVICE AND METHOD FOR CONTROLLING THE SAME

(71) Applicant: HONDA RESEARCH INSTITUTE EUROPE GMBH, Offenbach/Main (DE)

(72) Inventors: Nils Einecke, Offenbach (DE); Mathias Franzius, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 316 days.

(21) Appl. No.: 15/711,467

(22) Filed: Sep. 21, 2017

(65) Prior Publication Data

US 2018/0077860 A1  Mar. 22, 2018

(30) Foreign Application Priority Data

Sep. 22, 2016  (EP) .................................. 16190124

(51) Int. Cl.
*A01D 34/00* (2006.01)
*A01D 75/18* (2006.01)
(Continued)

(52) U.S. Cl.
CPC ......... *A01D 34/008* (2013.01); *A01D 75/185* (2013.01); *B60W 30/00* (2013.01);
(Continued)

(58) Field of Classification Search
None
See application file for complete search history.

(56) References Cited

U.S. PATENT DOCUMENTS

| 6,443,509 B1 * | 9/2002 | Levin | B60L 1/003 293/4 |
| 7,103,457 B2 * | 9/2006 | Dean | A01D 34/008 318/568.12 |

(Continued)

FOREIGN PATENT DOCUMENTS

| EP | 2 286 653 A2 | 2/2011 |
| EP | 2 447 014 A2 | 5/2012 |

(Continued)

OTHER PUBLICATIONS

European Search Report dated Mar. 27, 2017 corresponding to European Patent Application No. 16190124.4.

*Primary Examiner* — Bhavesh V Amin
(74) *Attorney, Agent, or Firm* — Squire Patton Boggs (US) LLP

(57) ABSTRACT

The invention regards a robotic gardening device comprising driving means for propelling the robotic gardening device, a working tool for performing dedicated gardening work and a controlling unit for controlling said driving means and the working tool and a method for controlling the same. The robotic gardening device further comprises at least one environment sensor generating a signal indicative of objects in the environment of the robotic gardening device, a computing unit for classifying these objects, wherein the classes comprise at least two different classes for objects being determined to be humans. The computing unit is configured to control the driving means and/or the working device according to a predetermined behavior associated with the respective objects class.

14 Claims, 4 Drawing Sheets

(51) Int. Cl.
- *G05D 1/02* (2020.01)
- *B60W 30/00* (2006.01)
- *G06K 9/00* (2006.01)
- *G06N 20/00* (2019.01)
- *G06T 7/73* (2017.01)
- *G06K 9/62* (2006.01)
- *G06T 7/20* (2017.01)

(52) U.S. Cl.
CPC ....... *G05D 1/0246* (2013.01); *G06K 9/00362* (2013.01); *G06K 9/00664* (2013.01); *G05D 2201/0208* (2013.01); *G06K 9/6212* (2013.01); *G06N 20/00* (2019.01); *G06T 7/20* (2013.01); *G06T 7/75* (2017.01); *G06T 2207/20081* (2013.01)

(56) References Cited

U.S. PATENT DOCUMENTS

| | | | | |
|---|---|---|---|---|
| 7,173,391 B2* | 2/2007 | Jones | | G05D 1/0219 318/568.12 |
| 7,295,106 B1* | 11/2007 | Jackson | | G06K 9/00771 340/5.8 |
| 7,379,813 B2* | 5/2008 | Kubota | | G08G 1/0962 701/300 |
| 7,598,848 B2* | 10/2009 | Takagi | | G06K 9/00805 180/275 |
| 7,894,305 B2* | 2/2011 | Sabatier | | G08B 13/1627 367/136 |
| 8,285,435 B2* | 10/2012 | Bernini | | A01D 34/008 701/23 |
| 8,903,588 B2* | 12/2014 | Schmudderich | | G06K 9/00798 701/23 |
| 8,983,662 B2* | 3/2015 | Moore | | H04N 9/3194 700/258 |
| 9,019,150 B2* | 4/2015 | Alalusi | | G01S 17/32 342/118 |
| 9,043,025 B2* | 5/2015 | Brooks | | B25J 9/1676 700/255 |
| 9,137,943 B2* | 9/2015 | Einecke | | G05D 1/0246 |
| 9,174,342 B2* | 11/2015 | Pinter | | G16H 40/67 |
| 9,387,589 B2* | 7/2016 | Barajas | | G05B 13/026 |
| 9,604,639 B2* | 3/2017 | Laur | | B60W 30/0953 |
| 9,776,323 B2* | 10/2017 | O'Sullivan | | B25J 9/1666 |
| 2003/0144774 A1* | 7/2003 | Trissel | | A01D 34/008 701/23 |
| 2007/0142964 A1* | 6/2007 | Abramson | | A47L 9/009 700/245 |
| 2007/0165931 A1* | 7/2007 | Higaki | | G06K 9/00201 382/128 |
| 2009/0066513 A1* | 3/2009 | Kondo | | G01V 15/00 340/572.1 |
| 2009/0146817 A1* | 6/2009 | Ikeda | | G08B 13/19697 340/572.1 |
| 2009/0198380 A1* | 8/2009 | Friedman | | B25J 5/00 700/259 |
| 2010/0076621 A1* | 3/2010 | Kubotani | | G08G 1/166 701/1 |
| 2010/0326030 A1* | 12/2010 | Bernini | | G05D 1/0227 56/10.2 A |
| 2011/0150348 A1* | 6/2011 | Anderson | | G05D 1/0088 382/224 |
| 2013/0054106 A1* | 2/2013 | Schmudderich | | G06K 9/6293 701/96 |
| 2013/0125085 A1* | 5/2013 | Shimizu | | G06F 30/36 716/139 |
| 2014/0024999 A1* | 1/2014 | Levien | | G16H 40/67 604/66 |
| 2014/0032033 A1* | 1/2014 | Einecke | | G06K 9/00664 701/24 |
| 2014/0341421 A1* | 11/2014 | Porikli | | G06K 9/00369 382/103 |
| 2015/0032290 A1* | 1/2015 | Kitahama | | G08G 1/16 701/1 |
| 2015/0088310 A1* | 3/2015 | Pinter | | G16H 40/67 700/253 |
| 2015/0239127 A1* | 8/2015 | Barajas | | B25J 9/1671 700/253 |
| 2016/0188977 A1* | 6/2016 | Kearns | | G05D 1/0274 348/113 |
| 2016/0229058 A1* | 8/2016 | Pinter | | G16H 40/67 |
| 2017/0057497 A1* | 3/2017 | Laur | | G06K 9/00348 |
| 2017/0345210 A1* | 11/2017 | Grufman | | G06F 3/04842 |
| 2018/0077860 A1* | 3/2018 | Einecke | | A01D 34/008 |
| 2019/0113927 A1* | 4/2019 | Englard | | G05D 1/0231 |

FOREIGN PATENT DOCUMENTS

| | | |
|---|---|---|
| EP | 2 689 650 A1 | 1/2014 |
| EP | 2 690 582 A1 | 1/2014 |

* cited by examiner

ROBOTIC GARDENING DEVICE AND METHOD FOR CONTROLLING THE SAME

BACKGROUND

Field

The invention regards a robotic gardening device such as an autonomous lawn mower or an autonomous scarifier and a method for controlling the same in particular its behavior in response to detection of different types of obstacles.

Description of the Related Art

The market for autonomous gardening devices such as autonomous lawn mowers or the like is increasing year by year. Robotic gardening devices increase comfort of the user drastically and thus become more and more popular. Since such mowers or scarifiers move autonomously without human supervision, safety is an important aspect during operation. Up to now, lawn mowers or scarifiers only have basic safety functions implemented such as bump sensors installed at the front side of the device. If the autonomous gardening device contacts an obstacle in the driving path, the autonomous gardening device will automatically change its driving direction and thus move away from the obstacle. In order to ensure safe operation, manuals of many autonomous mowers advise the user that persons and in particular, children must not be on the lawn while the gardening device is operational. However, the reality is different and many owners of autonomous lawn mowers or the like indeed use their garden while the mower operates.

Hence, one cannot rely human safety on the fact that actually they should leave the field of operation when the robotic gardening device is active. Safety features rather have to be integrated into the device itself so that it does not lie within the responsibility of the user that a collision between a human or an animal and the gardening device is avoided.

Some basic attempts to increase the safety of such robotic gardening devices are known from the state of the art. For example, U.S. Pat. No. 8,285,435 B2 describes an autonomous lawn mower that is equipped with a perception system capable of detecting grass, but also detecting when a human body contacts the frame of the mower. But still all humans are treated equally and thus it is not distinguished if the person being near the autonomous lawn mower has to be treated with particular care or if it is for example the owner that is well aware of the current operation of the device.

Furthermore, in EP 2 689 650 A2, it is described that the reaction of an autonomous lawn mower can be adapted to different classes of obstacles that are recognized by a perception system of the autonomous lawn mower. Thus, it is in particular possible to distinguish a human from a tree or an animal or the like. It is disclosed that driving and steering and thus the particular movement of the mower is controlled in response to a class of obstacles determined from environment perception. Again, no difference is made with respect to a degree of safety that is necessary for a detected human.

SUMMARY

Thus, there is still a need to improve the safety when operating a robotic gardening device such as an autonomous lawn mower or an autonomous scarifier. It is to be noted that in the following any explanation will be made with respect to an autonomous lawn mower. But it is evident that all aspects, features and details may also be realized with any other robotic gardening device such as a sacrifier or the like.

The object is achieved by a robotic gardening device according to independent claim 1 and the respective method for controlling such robotic gardening device. According to the invention, the robotic gardening device comprises a driving means for propelling the robotic gardening device. It furthermore comprises a working tool for performing dedicated gardening work. Such dedicated gardening work is for example cutting grass and therefore the robotic gardening device would be equipped with blades that are driven by for example an electric motor.

The robotic gardening device furthermore comprises a controlling unit for controlling operation of the driving means and the working tool. Controlling the driving means includes control of driving direction and driving speed. The device furthermore comprises at least one environment sensor that is capable of obtaining information from the environment. Such sensor may be a camera, a sonar sensor, a lidar sensor, a radar sensor, a time of flight sensor, stereo cameras or one or more microphones. Additional information might be provided by bump sensors, IMU's (Inertial Measuring Units) or compass sensors.

The signal generated by the at least one environment sensor is supplied to a computing unit which is configured to classify obstacles. The classification of obstacles per se is known from the prior art, but it is in particular useful to use HOG features (Histogram of Oriented Gradients) since these have proven to be very robust. The obstacles (objects) perceived are classified in a plurality of classes wherein these classes comprise at least two different classes for detected humans. Humans are one type of a plurality of life forms that can also include animals. But with the present invention it is in particular distinguished between two different kinds of humans that require a different treatment with respect to safety. A controlling unit is configured to control, on the basis of the output of the computing unit, the driving means and/or the working device according to a predetermined behavior that is associated with the respective class. Since at least two different classes are used to distinguish between different kinds of humans, it is thus possible to adapt the safety measure to the particular detected kind of human.

For example, it is possible to classify humans that can be assumed to be fully aware of the operation of an autonomous lawn mower in one class and to classify others where one usually cannot expect that such human is cautious about operation of a machine in another class. For each class then, a safety distance for example can be set differently from a safety difference of the second class. Such safety distance might be used for defining the minimal distance that the autonomous lawn mower is allowed to approach towards a detected obstacle being determined to be a human. This allows to define different levels of safety depending on different groups of human beings.

Advantageous aspects and features are defined in the dependent claims.

It is in particular advantageous to distinguish between "adults" and "children" both being determined to be humans, but of course require different levels of safety. While adults can be assumed to be cautious themselves with respect to an operating machine, children will usually not take any notice and thus move on a lawn without caring about a driving direction of an autonomous lawn mower. Thus, it is in particular useful to distinguish between the safety requirements of a child and an adult and consequently if an obstacle is detected as being a human, it is advantageous to classify accordingly. One aspect for distinguishing between adults and children may be the body size.

It is furthermore advantageous to additionally define the class "animal" and/or "unknown person". By defining these further classes, it is thus possible to tailor the behavior of the autonomous lawn mower in response to classification of an object to particular situations. For example, an animal that is determined as an obstacle could possibly be scared and thus be motivated to leave the garden. This is in particular advantageous as some animals tend to dig holes into a lawn. On the other side, the class "unknown person" can be used to associate a behavior that is useful for either warn the user of the lawn mower. It is for example possible to determine an adult that moves over the lawn during night time as such unknown person or even unwanted person. Such unknown person moving on the lawn towards the house might be for example a thief and thus a warning of the owner of the lawn mower could even be useful to avoid a break in to classify such unknown person additional information like daytime can be used when an adult is determined.

According to another advantageous aspect, the computing unit is configured to predict the future behavior for a detected human. Such future behavior in the easiest case is the prediction of the current movement of the person. If the person for example walks over the lawn, it is possible to predict by per se known prediction algorithms the direction of further movement of the person. Thus, it is possible to determine if the driving direction and the moving direction of the person cross each other and based on such evaluation, an evasion strategy for the robotic gardening device may be planned. The prediction of the future behavior gives the possibility to take into account that usually a person behaves different from static objections and thus the prediction allows to take into consideration early such movement of a person when controlling in particular the driving direction and/or speed of the autonomous lawn mower.

Advantageously, at least one of the following future behaviors that may be performed by a human can be computing by the predicted unit: crossing the current path of the robotic gardening device, interaction of the determined human with the robotic gardening device which means that it is determined that the human for example directly approaches the autonomous lawn mower. This might be the case if the user or operator wants to make some adjustments or for any other reason needs to manipulate switches or the like of the autonomous lawn mower. Other possible behaviors are: Stealing the robotic gardening device, touching the robotic gardening device, breaking in the house, playing in the garden, gardening work, wiring the garden, damaging the garden. Each of these different behaviors may be predicted based on typical movements that are perceived by the environment sensor that allow classifying an observed movement of a detected human.

It is furthermore advantageous that the computing unit comprises a classifier using deep learning and/or HOG features and/or optical flow and/or stereo camera depth data for determining an obstacle as a human or an animal. As mentioned above, the HOG features have proven to be very robust and in particular these features are well known for detecting pedestrians that walk into a driving path of a vehicle. Thus, algorithms that are known from warning systems or emergency braking systems of vehicles like cars may be adapted for distinguishing life forms such as humans from static obstacles. Techniques like optical flow are also very useful to identify life forms and distinguish from static obstacles. In combination with map data it is possible to calculate an optical flow that is caused by the motion of the autonomous lawn mower of static obstacles and compare it to an optical flow of other obstacles that are not known from the map. These other obstacles rather likely are not static and will thus change their position. Thus, since often static elements or obstacles are included in map data, map data is helpful to distinguish between non-static and static objects. On the other side, an artificial neural network may be used for deep learning which shows that object detection can be very precise. This technique is thus also very suitable for detecting and distinguishing different life forms. It is to be noted that in this sense meaning "different life forms" does not only relate to distinguishing between animals and human beings, but also between children and adults.

BRIEF DESCRIPTION OF THE DRAWING

The invention will now be explained with more detail taking into consideration the drawings in which.

DETAILED DESCRIPTION

Figure 1:
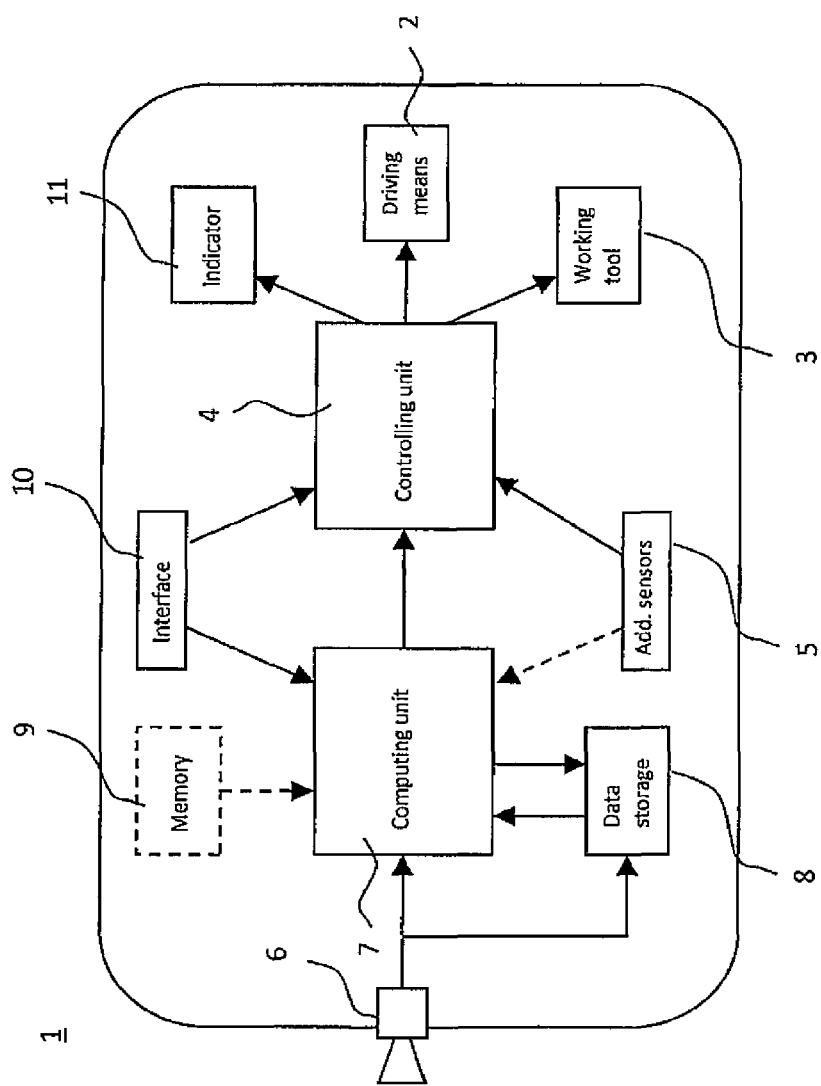
FIG. 1 shows a schematic of an autonomous lawn mower as an example for a robotic gardening device.

In FIG. 1 a schematic of an autonomous lawn mower 1 as one example for a robotic gardening device is shown. The autonomous lawn mower 1 in a known manner comprises a driving means 2 and a working tool 3. The driving means 2 comprises a drive motor that is mechanically connected to drive wheels in order to propel the vehicle. It is to be noted that further parts of the entire driving mechanism that are well known in the art are not shown in the schematic. This is for example an energy storage like an accumulator or the like.

The working tool 3 comprises a further drive motor for driving blades on the lower side of the autonomous lawn mower 1 for cutting grass. Working tool 3 and driving means 2 both are controlled by a controlling unit 4 which is for example a data processing unit like a controller that supplies the driving means 2 and the working tool 3 with respective drive signals. Working tool 3 is controlled for activating a deactivating rotation of the blades whereas the drive motors of the driving means 2 are driven in order to propel the entire autonomous lawn mower 1 at a speed and in an intended direction.

The controlling unit 4 is furthermore connected with one or a plurality of sensors like for example a sonar sensor, a gyroscope or a bump sensor which are commonly denoted by reference numeral 5. The sensor or these sensors 5 interact in a known way with controlling means 4.

Typically, autonomous lawn mowers 1 move in random (or partially structured) pattern in their working area. They move straight until they hit an obstacle which is detected by the bump sensor 5 or they reach the borderline of their working area. The working area is marked by an electric boundary wire which is detected by a corresponding sensing means of the autonomous lawn mower 1. When an obstacle is hit or when the boundary wire is detected to be reached, the autonomous lawn mower 1 turns to another direction and again moves straight. This behavior is sufficient for good mowing performance, but of course, it is not optimal with respect to safety and comfort. As indicated above, manuals of autonomous lawn mowers 1 advise thus the users to keep the lawn free of people and pets while the mower is working. In reality, a lot of users do not adhere to this advice. One reason might be that often autonomous lawn mowers 1 are regarded to something similar to a pet. Thus, according to the invention, it is intended to improve the capability of the autonomous lawn mower 1 by ensuring that the behavior of the autonomous lawn mower 1 is better adapted to the experienced situation, in particular with respect to human that are present in the environment of the autonomous lawn mower 1.

According to the invention, the autonomous lawn mower thus comprises an environment sensor which is preferably a camera 6 supplying its signal corresponding to a camera image and thus indicative of objects in the environment of the autonomous lawn mower 1 to a computing unit 7. The computing unit 7 is connected to a data storage 8 where images taken by the camera 6 can be stored for learning new objects for future evaluation. The camera image that is received from camera 6 is evaluated in the computing unit 7 and objects in the image are classified. When classifying the objects (which are obstacles for the mower), it is basically distinguished between life form objects and non-life form obstacles. The life form objects can be distinguished to be either humans or animals. If an object is determined to be humans, this object is classified in one of at least two different classes. These classes at least comprise the classes "adults" and "children". For detecting humans, known techniques such as HOG features for detecting pedestrians and optical flow can be applied. But also deep learning using artificial neural networks can be applied in order to classify different types of humans such as children and adults. For distinguishing between adults and children the size of the detected object can be used, for example.

Furthermore, it is preferred that in addition to classifying detected humans as being "adult" or "child" a prediction of the movement behavior of such human is determined in the computing unit 7.

For determining and classifying humans to either of the classes, learned or predefined object data stored in the data storage 8 is used. It is preferred that at least basic object data is pre-stored during the manufacturing of the autonomous lawn mower 1. But according to a preferred embodiment, it is also possible that the autonomous lawn mower 1 uses a learning algorithm to improve the data base during operation. Thus, a new observation of a previously unknown object is added to the data storage 8 and can be used as a basis for further evaluation of the camera image.

After the classification of the objects and in particular the different kinds of humans, information on the detected objects including at least the class is forwarded to the controlling unit 4. Furthermore, the predicted object movement of the classified obstacles is also supplied to the controlling unit 4.

Based on the class of the object and the predicted object movement, the controlling unit 4 generates control signals for the driving means 2 and/or for the working tool 3.

The controlling unit 4 generates the control signal according to a predetermined behavior that is associated with the class of the detected object. Thus, for each different class, an individual behavior is performed. The control unit 4 thus selects a suitable predetermined behavior and generates driving signals which then are fed to the driving means 2. Association of a mower behavior and a class may be stored in a table accessible by the controlling unit 4.

It is to be noted that a plurality of different behaviors can be associated with one particular class. In that case, additional information is used in order to select the desired mower behavior. Thus, if an object is determined to belong to the class "adult", an associated mower behavior might be that the autonomous lawn mower 1 simply avoids collision with the person which is standing still on the lawn. But in case that in addition to the object being determined to be an adult, it might be that a moving direction of this person is determined, because the person is walking. In that case, another mower behavior also associated with the class "adult" might be selected, for example, an evasion route so that the autonomous lawn mower 1 drives around the walking person. Examples will be given later in FIG. 3.

In order to assist the evaluation of the camera image, it is also preferred that a garden map 9 is stored in the autonomous lawn mower 1 either in the data storage 8 or as indicated in FIG. 1 in a separate memory 9. Such garden map can be used to obtain auxiliary information in order to distinguish between static objects and non-static objects because humans or animals will not be included in the map data obviously. Thus, the objects that are included in the map data are more likely to be static objects.

The selection and association of the behavior that has to be performed by the autonomous mower 1 in response to identifying an object and classify it to a particular class can be configured via an interface 10. The interface 10 is configured to communicate for example with an application executed on a Smartphone or any other remote device (tablet, computer, . . . ). By means of such application, the user can change parameters of the detection or association of predetermined behaviors that are to be performed in reaction to an object determined to belong to a particular class.

According to the invention, in case that an obstacle or an object in the camera image is determined to be a human, it is distinguished between different kinds of human such as "child" and "adult". Consequently, the behavior, meaning the reaction to a detected child as a first class or a detected adult as a second class, can be adapted suitably.

Figure 2:
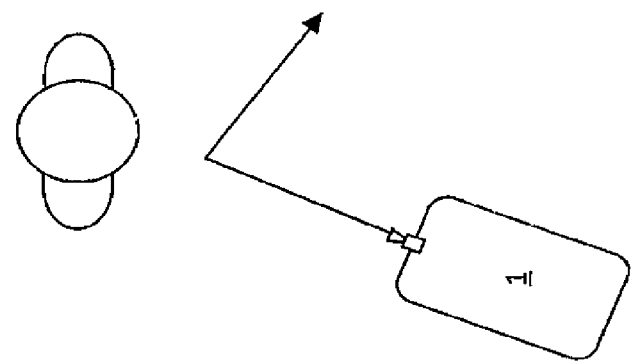
FIG. 2 shows a schematic illustrating one example of different future behaviors of a robotic gardening device according to the invention depending on the class of a determined object.
Figure 2:
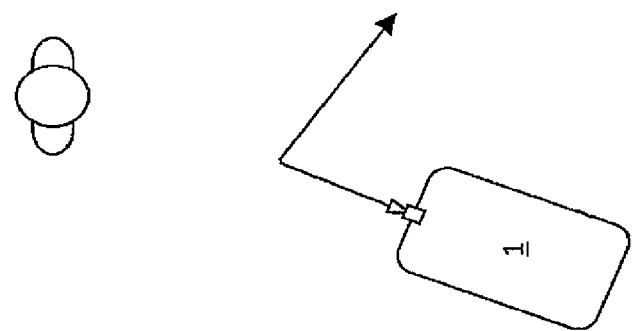

The right side in FIG. 2 shows an example where the autonomous lawn mower 1 approaches an adult and changes its driving direction when it is already relatively close to the adult. The minimum distance that is reached by the autonomous lawn mower 1 can selected to be shorter than the distance when the autonomous lawn mower 1 approaches a child which is illustrated in the left half of FIG. 2. This is a first simple example how the invention works. The behavior that is associated with class "child" can also include switching off the mowing blades or even returning to the base station. Thus, if children are playing on the lawn, it can be avoided that the autonomous lawn mower 1 again and again determines humans belonging to the class "child" and thus changes its current driving direction and/or interrupts its cutting operation. Thus, if children are on the ground, the mower can pause its operation for example for a predetermined time interval and use this time for charging at the base station. The mowing operation is then re-scheduled. After a certain time elapsed, the autonomous lawn mower 1 can resume the mowing operation with better efficiency, because now hopefully no children are on the lawn disturbing the operation of the autonomous lawn mower 1.

Furthermore, it can be evaluated if only one human or a plurality of humans or other life forms like animals are detected. In case that at the same time multiple life forms are recognized to be on the lawn, it can be assumed that the lawn is used by the owners for recreational activities. In that case, it is not reasonable that the mower keeps on mowing this garden one and here it is preferred that the autonomous lawn mower 1 moves to a different garden zone or returns to the base station. The autonomous lawn mower 1 will then start operation again after a certain time interval has elapsed or if a preset daytime is reached. Such returning to the base station and starting operation at a later point in time does not only increase safety, but also efficiency as mentioned above, because more objects in the garden mean also more avoidance behaviors which is less efficient. A different garden zone can be any area of the garden that is distant from the crowded area where the people have been determined.

In the controlling unit 4 it is also possible to evaluate the detection result with respect to the daytime. Via the interface it is for example possible to define times, for which it is assumed that no person is on the lawn, like for example the working hours of the owner. Thus, if during such time period, for example when the owner is at work, humans are detected by the computing unit 7, these humans may be considered to be criminals approaching the house from the garden side in order to break in. In this case, the controlling unit 4 can be programmed to transmit via the interface unit 10 an alert. This alert can be received by the application running on the Smartphone and thus the user is informed immediately.

Sometimes, garden owners are bothered by certain animals that stray their gardens causing damage or dirt. Thus, if such animals can be classified in a particular class "unwanted animal" detection of such animal can cause the autonomous lawn mower 1 to try and scare such animals with noise output by a loudspeaker (not shown in the drawing) or by driving directly towards them or chasing them. Thus, with such class "unwanted animal" the controlling unit 4 controls the driving means such that the autonomous lawn mower 1 tries to approach the detected animal and may be additionally output some sound.

It is to be noted that the classes and possible mower behaviors are not meant to be limited to the examples given and other classes or behaviors can be defined. Additionally, the behaviors and events themselves can be parameterized for example with respect to detection distance, number of life forms at the same time, avoidance distance, wait times in base station or the like.

Figure 3:
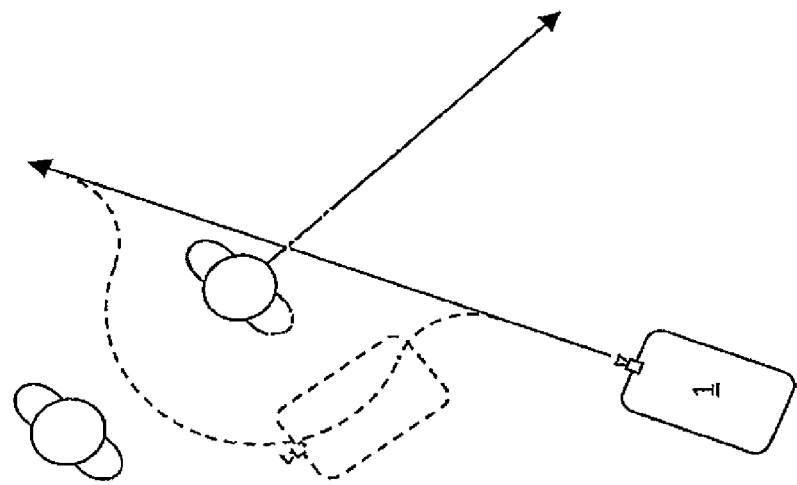
FIG. 3 shows an example for another behavior of the robotic gardening device determined and controlled on the basis of predicted movements.
Figure 3:
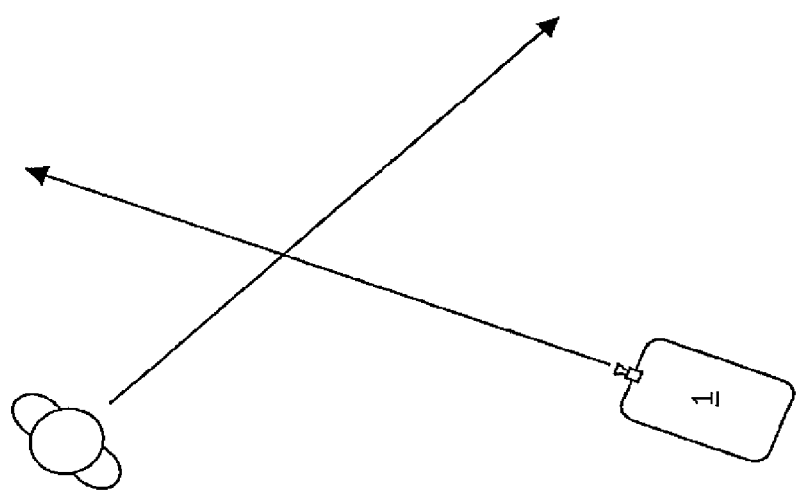

As it was mentioned above, it is not only possible to associate a particular behavior with a class, but also to associate a plurality of behaviors with a class and selecting a particular behavior on the basis of a predicted behavior of the detected object. In case that an adult is determined that moves across the lawn, the movement trajectory of the person can be predicted or estimated in order to find out if the current trajectory of the autonomous lawn mower 1 and the trajectory of the person will cross each other and a collision would take place. Such a situation is shown in FIG. 3 (left side) in which the arrows indicate the future trajectory of the autonomous lawn mower 1 and the person 15 if the current speed and direction of movement is maintained by the person and the autonomous lawn mower 1. Since the arrows cross each other it can be inferred that the collision will occur if the person and the autonomous lawn mower maintain their current moving direction and speed. In that case the behavior that is selected and which is also associated with the class "adult" (but possibly also with other classes), the controlling unit 4 plans an evasion route as it is shown in FIG. 3b. This new route or path (indicated as dashed line in FIG. 3) includes a curve which goes around the detected person. Thereafter the autonomous lawn mower 1 continues driving in its original driving direction. The movement prediction can be done by analyzing the optical flow for the detected person. Additionally, stereo camera processing can increase the accuracy of a 3D-movement prediction. By using a linear prediction module, the mower can infer the future positions of the person.

Since normally the lawn mower drives straight and only changes its direction once, if it bumps into an obstacle the lawn mower 1 may be equipped with one or more indicators 11. The indicators 11 are connected to the controlling unit 4 also and are suitable to inform a person in the vicinity of the lawn mower 1 of a behavior that is about to be performed in response to detection of an object of a particular class. This information can be given be announcing the respective behavior using a loudspeaker or be flashing lights that indicate the direction in which the autonomous lawn mower 1 will move next.

Another future behavior that may be predicted may be an approach of a person. For example, the owner of the mower wants to change the mowers' settings. Thus, if the movement prediction shows that an adult person is directly approaching the mower, the associated behavior could be to move towards the approaching person. Thus, this will reduce the distance the owner has to walk to change settings. On the other hand, if an approach is recognized for a child, then a possibly dangerous situation has to be avoided, because small children may want to touch or play with the mower. Thus, in that case, it is preferred to immediately stop the cutting clades and also to stop the movement of the mower. Additionally, a warning message may be sent to the owner via the interface unit 10.

As mentioned above, an adult for example may be detected during a daytime where usually the owner of the autonomous lawn mower 1 is not at home. In that case, there is a danger that a thief approaches the autonomous lawn mower 1 with the intention to steal the mower. Thus, if an approaching person is detected during such daytime defined in the settings by the owner, the behavior of the autonomous lawn mower 1 is programmed to try to move away from the approaching person. Thus, the thief cannot easily steal the autonomous lawn mower 1 especially if also the driving speed is increased. Furthermore, a warning sound could be output in order to scare the thief and to possibly raise the attention of neighbors.

Figure 4:
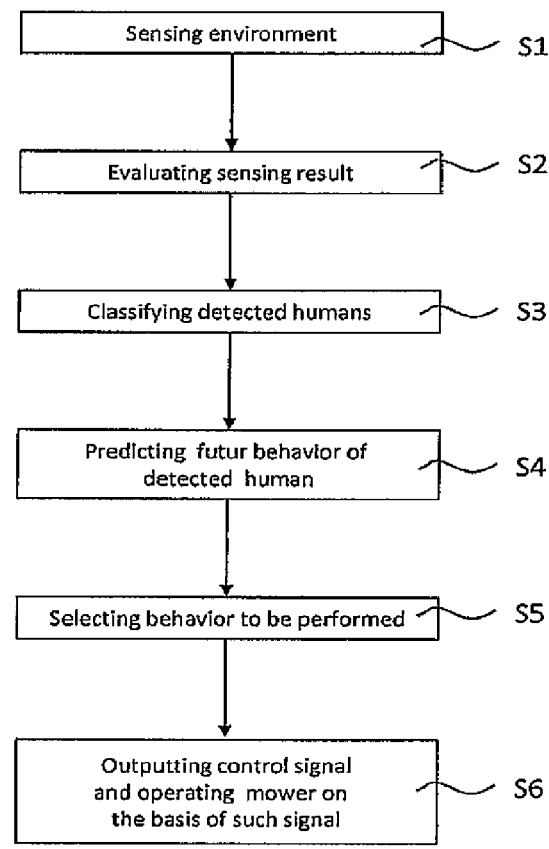
FIG. 4 shows a simplified flow chart illustrating the main method steps for controlling a robotic gardening device according to the invention.

FIG. 4 shortly summarizes the main method steps for controlling the autonomous lawn mower. At first, in step S1, the environment of the autonomous lawn mower is sensed. Then, on the basis of the sensing result, an evaluation is made in step S2 and in case that a human is detected it is classified to which of at least two different classes such human being belongs to (step S3). Advantageously, a behavior of the person being detected is also determined in step S4 and on the basis of either the determined class only or the determined class in combination with the predicted behavior of the detected person, a behavior to be performed by the autonomous lawn mower 1 is determined (step S5). The control unit 4 outputs a control signal (step S6) to the driving means 2 and/or the working tool 3 to control the autonomous lawn mower 1 according to the intended behavior.

It is to be noted that in addition there might be some behaviors of objects predicted, in particular of persons in the vicinity of the autonomous lawn mower1, that are more complex and not directly involve the mower's operation. These might include breaking in a house, playing in the garden, doing garden work, miring the garden or damaging the garden. For detecting these behaviors, the simple optical flow analysis is not sufficient but image classifier techniques like deep learning need to be applied. The learning could either be done offline before product deployment or the mower could try to learn such behaviors during operation.

As mentioned above, all the examples have been given with respect to an autonomous lawn mower, but could be applied to any robotic gardening device comprising at least driving means for propelling the gardening device.

The invention claimed is:

1. Robotic gardening device comprising
   driving means for propelling the robotic gardening device,
   a working tool for performing dedicated gardening work,
   a controlling unit for controlling said driving means and the working tool, at least one environment sensor generating a signal indicative of objects in the environment of the robotic gardening device, and
   a computing unit for classifying the objects in plurality of classes, wherein
   the classes comprise at least two different classes for objects being determined to be different kinds of humans that require a different treatment with respect to safety, wherein
   the computing unit is configured to predict a future behavior for a detected and classified human, and wherein
   the controlling unit is configured to control the driving means to avoid a collision between a human and the robotic gardening device or to move the robotic gardening device towards the human depending on the predicted behavior associated with the respective object class.

2. Robotic gardening device according to claim 1, wherein the object classes comprise at least "adult" and "children".

3. Robotic gardening device according to claim 2, wherein the object classes further comprise "animal" or "unknown person".

4. Robotic gardening device according to claim 1, wherein
   the computing unit is configured to predict at least one of the following possible future behaviors: crossing the current path of the robotic gardening device, interact with the robotic gardening device, stop the robotic gardening device, steal the robotic gardening device, touch the robotic gardening device, break into a house, play in the garden, do garden work, mire the garden, damage the garden.

5. Robotic gardening device according to claim 1, wherein
   the computing unit comprises a classifier using deep learning or HOG features or optical flow or stereo camera depth data for determining an objects as a human or an animal.

6. Robotic gardening device according to claim 1, wherein garden map data is stored in a memory of the robotic gardening device and the computing unit is configured to read in the map data and use it for classifying objects.

7. Robotic gardening device according to claim 1, wherein
   predetermined behaviors include at least one or a plurality of:
   turning away from an obstacle, driving around an obstacle, returning to a base station, driving to a different zone, driving speed change, turn off working tool, follow the obstacle, approaching the obstacle, record sensor data, performing a scaring action, pausing and warning, reschedule working operation.

8. Robotic gardening device according to claim 1, wherein
   a plurality of predetermined behaviors is associated with one objects class and the computing unit is configured to select one out of the plurality of predetermined behaviors depending on object distance, daytime, number of life form objects detected at the same time, position of a life form object.

9. Robotic gardening device according to claim 1, wherein
   the robotic gardening device comprises an interface for receiving user input defining association of predetermined behaviors and object classes.

10. Robotic gardening device according to claim 1, wherein
    the robotic gardening device comprises an interface for outputting an information signal indicative of presence of a life form object in a configurable time period.

11. Robotic gardening device according to claim 1, wherein
    the robotic gardening device comprises indication means to indicate its own future behavior.

12. Robotic gardening device according to claim 1, wherein
    the robotic gardening device is an autonomous lawn mower or an autonomous scarifier.

13. Method for controlling a robotic gardening device comprising the steps of:
    sensing the environment around the robotic gardening device,
    determining if perceived objects are human and if yes,
    classifying detected humans that require a different treatment with respect to safety in one of at least two different classes,
    predicting a future behavior for a detected and classified human,
    determining a behavior to be performed by the robotic gardening device according to the predicted future behavior associated with the respective object class, and
    controlling a driving means to avoid a collision between a human and the robotic gardening device or to move the robotic gardening device towards the human depending on the predicted behavior associated with the respective object class.

14. Robotic gardening device according to claim 1, wherein the computing unit is configured to control the working tool according to the predicted behavior associated with the respective object class.

* * * * *